(12) United States Patent
Ito et al.

(10) Patent No.: US 10,943,739 B2
(45) Date of Patent: Mar. 9, 2021

(54) ELECTRONIC COMPONENT

(71) Applicant: TDK CORPORATION, Tokyo (JP)

(72) Inventors: Shinya Ito, Tokyo (JP); Akitoshi Yoshii, Tokyo (JP); Kenichi Inoue, Tokyo (JP); Yoshiki Satou, Tokyo (JP)

(73) Assignee: TDK CORPORATION, Tokyo (JP)

( * ) Notice: Subject to any disclaimer, the term of this patent is extended or adjusted under 35 U.S.C. 154(b) by 35 days.

(21) Appl. No.: 16/430,858

(22) Filed: Jun. 4, 2019

(65) Prior Publication Data

US 2019/0371529 A1    Dec. 5, 2019

(30) Foreign Application Priority Data

Jun. 5, 2018  (JP) .............................. JP2018-107881

(51) Int. Cl.
*H01G 4/38* (2006.01)
*H01G 4/228* (2006.01)
*H01G 4/224* (2006.01)
*H01G 2/10* (2006.01)
*H01G 4/30* (2006.01)

(52) U.S. Cl.
CPC .............. *H01G 4/38* (2013.01); *H01G 2/106* (2013.01); *H01G 4/224* (2013.01); *H01G 4/228* (2013.01); *H01G 4/30* (2013.01)

(58) Field of Classification Search
CPC .......... H01G 4/38; H01G 4/232; H01G 4/224; H01G 4/228
See application file for complete search history.

(56) References Cited

U.S. PATENT DOCUMENTS

| 2014/0043723 | A1 | 2/2014 | Hattori et al. | |
|---|---|---|---|---|
| 2014/0376157 | A1* | 12/2014 | Oh | H01G 2/04 361/434 |
| 2015/0187502 | A1* | 7/2015 | Hwang | H01G 4/224 361/679.01 |
| 2017/0178819 | A1* | 6/2017 | Wang | H01G 4/38 |

FOREIGN PATENT DOCUMENTS

JP      2014-053588 A    3/2014

* cited by examiner

*Primary Examiner* — Eric W Thomas
(74) *Attorney, Agent, or Firm* — Oliff PLC

(57) ABSTRACT

A plurality of electronic elements 3 are arranged in a second direction D2 orthogonal to a first direction D1 which is a facing direction of external electrodes 3b and 3c forming a pair in the first electronic element group 5A and the second electronic element group 5B. The first electronic element group 5A and the second electronic element group 5B are disposed side by side in the first direction D1. The first terminal 7 is disposed between the first electronic element group 5A and the second electronic element group 5B in the first direction D1. The second terminals 9 and 11 are disposed at positions with the first electronic element group 5A and the second electronic element group 5B respectively interposed between the second terminals and the first terminal 7 in the first direction D1.

9 Claims, 15 Drawing Sheets

ELECTRONIC COMPONENT

TECHNICAL FIELD

The present invention relates to an electronic component.

BACKGROUND

Regarding electronic components in the related art, for example, an electronic component disclosed in Patent Literature 1 (Japanese Unexamined Patent Publication No. 2014-53588) is known. The electronic component disclosed in Patent Literature 1 includes a first laminate that has a plurality of first internal electrodes, a second laminate that has a plurality of second internal electrodes, a first external electrode that is provided in one end portion of each of the first laminate and the second laminate and is electrically connected to each of the first internal electrodes and the second internal electrodes, and a second external electrode that is provided in an opposite end portion of each of the first laminate and the second laminate and is electrically connected to each of the first external electrodes and the second external electrodes.

SUMMARY

In electronic components, in order to achieve desired electrical characteristics, a plurality of electronic elements (chip components) are connected to each other. For example, in electronic components, in order to ensure a large electrostatic capacitance, a plurality of capacitors are connected to each other in parallel. In this configuration, an electronic component inevitably increases in size. In a circuit board or the like on which an electronic component is mounted, a space for mounting an electronic component is limited. Therefore, there is a demand for miniaturization in electronic components including a plurality of electronic elements.

An object of an aspect of the present invention is to provide an electronic component which can be miniaturized.

According to the aspect of the present invention, there is provided an electronic component including a first electronic element group and a second electronic element group that are configured to include a plurality of electronic elements having a pair of external electrodes facing each other, a first terminal that is connected to one external electrode of each of the plurality of electronic elements in the first electronic element group and one external electrode of each of the plurality of electronic elements in the second electronic element group, and second terminals that are connected to an opposite external electrode of each of the plurality of electronic elements in the first electronic element group and an opposite external electrode of each of the plurality of electronic elements in the second electronic element group. The plurality of electronic elements are arranged in a second direction orthogonal to a first direction which is a facing direction of the pair of external electrodes in the first electronic element group and the second electronic element group. The first electronic element group and the second electronic element group are disposed side by side in the first direction. The first terminal is disposed between the first electronic element group and the second electronic element group in the first direction. The second terminals are disposed at positions with the first electronic element group and the second electronic element group respectively interposed between the second terminals and the first terminal in the first direction.

In the electronic component according to the aspect of the present invention, in each of a first capacitor group 5A and a second capacitor group 5B, laminated capacitors 3 are disposed in the second direction. The first capacitor group and the second capacitor group are disposed side by side in the first direction orthogonal to the second direction (facing direction of the pair of external electrodes of the electronic elements). The first terminal is disposed between the first capacitor group and the second capacitor group. The second terminals are disposed at positions with the first electronic element group and the second electronic element group respectively interposed between the second terminals and the first terminal in the first direction. According to this configuration, the electronic component can be miniaturized in a configuration in which the plurality of electronic elements are connected to each other in parallel.

In the embodiment, the second terminal may cause the opposite external electrode of each of the plurality of electronic elements in the first electronic element group and the opposite external electrode of each of the plurality of electronic elements in the second electronic element group to be electrically connected to each other. For example, in a configuration in which a second terminal that is connected to the opposite external electrode of the plurality of electronic elements in the first electronic element group and a second terminal that is connected to one external electrode of each of the plurality of electronic elements in the second electronic element group are isolated from each other, when the electronic component is mounted, there is a need for two second terminals to be electrically connected to each other using a wiring or the like. In the electronic component according to the embodiment, the electronic elements in the first electronic element group and the electronic elements in the second electronic element group are electrically connected to each other in the electronic component. Therefore, the electronic component can be easily mounted on a circuit board or the like.

The embodiment may further include a case that accommodates the first electronic element group and the second electronic element group and has electrical insulation properties. In this configuration, the first electronic element group and the second electronic element group are accommodated inside the case. Therefore, in the electronic component, the size of the electronic component can be set by setting the size of the case.

In the embodiment, the case may have a first wall portion and a second wall portion which form a pair facing each other in the first direction; a third wall portion and a fourth wall portion which form a pair facing each other in the second direction; and a bottom portion which closes one opening portion formed by the first wall portion, the second wall portion, the third wall portion, and the fourth wall portion. In this configuration, the case has a box shape. Accordingly, in the electronic component, the first electronic element group and the second electronic element group can be reliably accommodated in the case.

In the embodiment, the first terminal may have a first member which extends in the first direction, and a second member which extends in the second direction and is connected to one external electrode of each of the plurality of electronic elements in the first electronic element group and one external electrode of each of the plurality of electronic elements in the second electronic element group. The second terminal may have a first member which extends in the first direction; a second member which is connected to one end portion of the first member in the first direction, extends in the second direction, and is connected to the opposite external electrode of each of the plurality of electronic elements in the first electronic element group; and a third member which is connected to an opposite end portion of the first member in the first direction, extends in the second direction, faces the second member in the first direction, and is connected to each of the opposite external electrodes of the plurality of electronic elements in the second electronic element group. In this configuration, the electronic elements in the first electronic element group and the electronic elements in the second electronic element group can be connected to each other in parallel.

In the embodiment, the first terminal may have a third member through which the first member and the second member are coupled to each other. The third member may be disposed to face the plurality of electronic elements. In this configuration, movement (misalignment or the like) of the electronic elements can be restricted due to the third member. Therefore, in the electronic component, falling off of the electronic elements can be avoided.

In the embodiment, at least one of the first terminal and the second terminal may have a biasing portion which biases each of the plurality of electronic elements such that each of the plurality of electronic elements is pressed to the facing terminal side in the first direction. In this configuration, the electronic elements are biased (pressed) to at least one terminal side. Therefore, the electronic elements can be adequately held between the first terminal and the second terminal.

In the embodiment, the biasing portion may be divided into a plurality of portions in a manner corresponding to each of the plurality of electronic elements. In this configuration, even when the plurality of electronic elements differ from each other in size, the plurality of electronic elements can be held between the first terminal and the second terminal.

The embodiment may further include a plurality of electronic element groups including the first electronic element group and the second electronic element group. The plurality of electronic element groups may be disposed side by side with an insulating member interposed therebetween inside the case. One electronic element group and another electronic element group may be connected to each other in parallel. In this configuration, the plurality of electronic elements can be connected to each other in parallel.

According to the aspect of the present invention, miniaturization can be achieved.

DETAILED DESCRIPTION

Hereinafter, with reference to the accompanying drawings, preferable embodiments of the present invention will be described in detail. The same reference signs are applied to elements which are the same or corresponding in the description of the drawings, and duplicated description will be omitted.

First Embodiment

Figure 1:
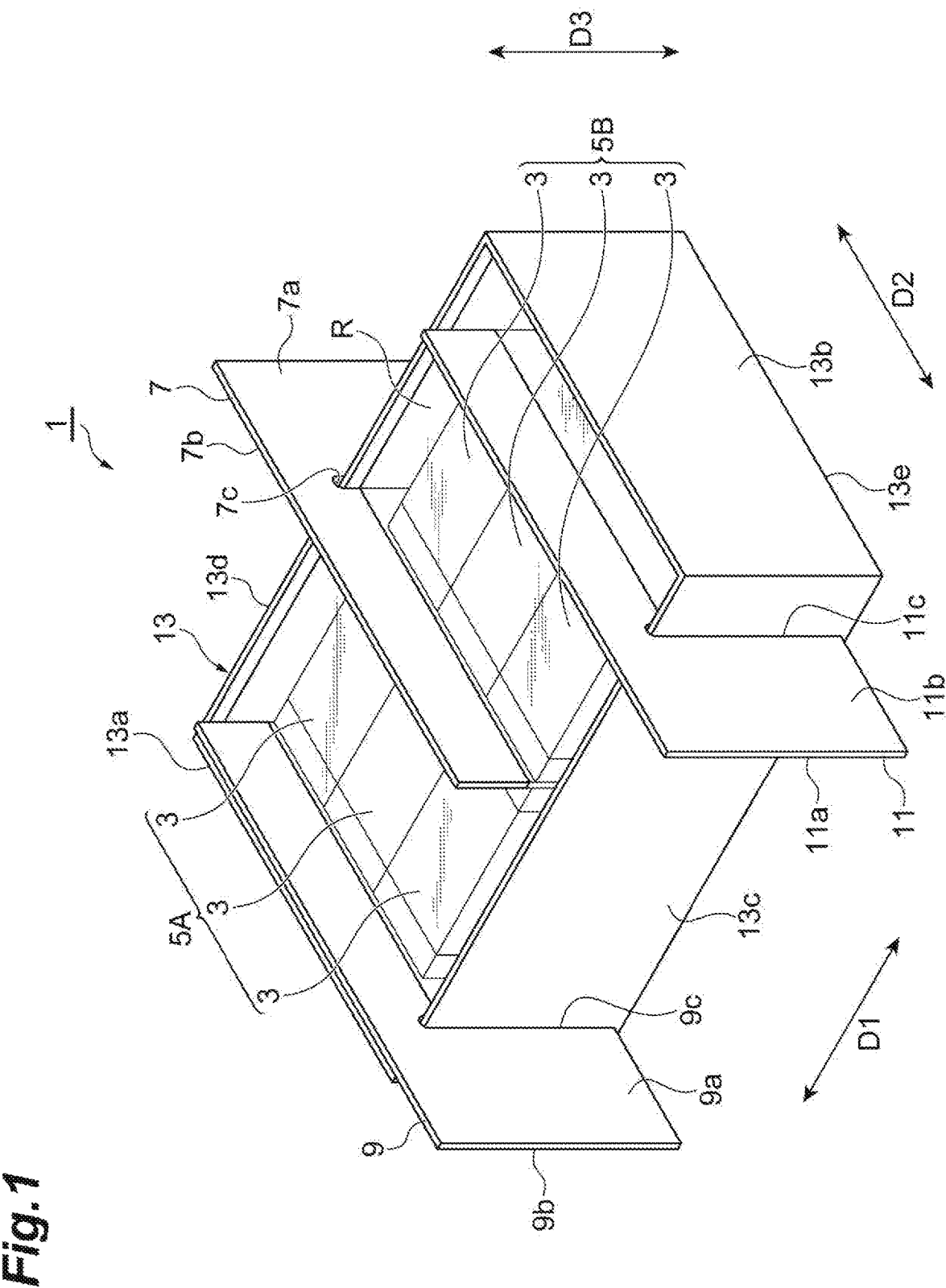
FIG. 1 is a perspective view illustrating an electronic component according to a first embodiment.
Figure 2:
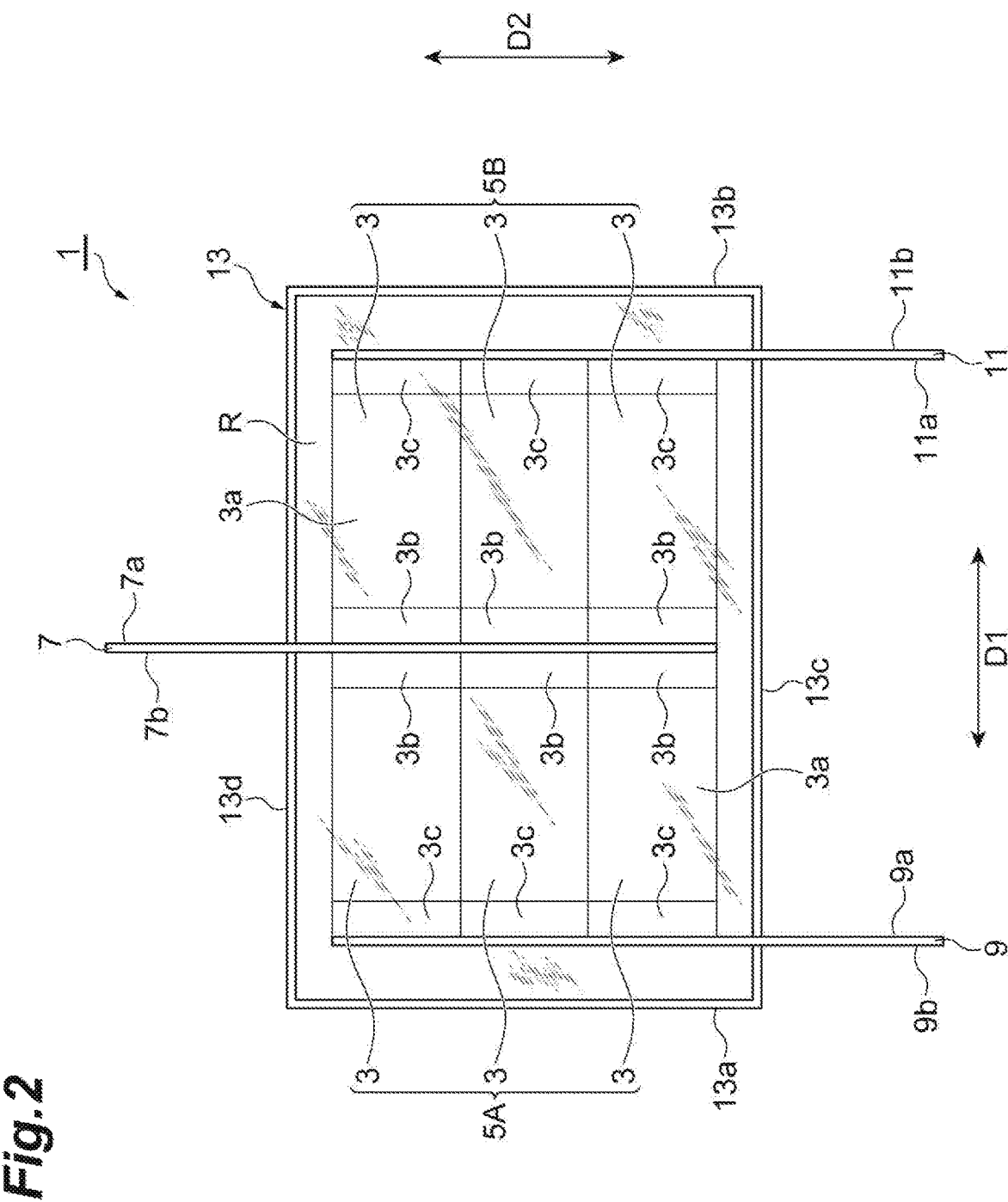
FIG. 2 is a top view of the electronic component illustrated in FIG. 1.

As illustrated in FIGS. 1 and 2, an electronic component 1 according to a first embodiment includes a first capacitor group (first electronic element group) 5A, a second capacitor group (second electronic element group) 5B, a first terminal 7, second terminals 9 and 11, and a case 13. In the electronic component 1, the first capacitor group 5A, the second capacitor group 5B, the first terminal 7, the second terminals 9 and 11, and the case 13 are integrated (modularized).

Figure 4:
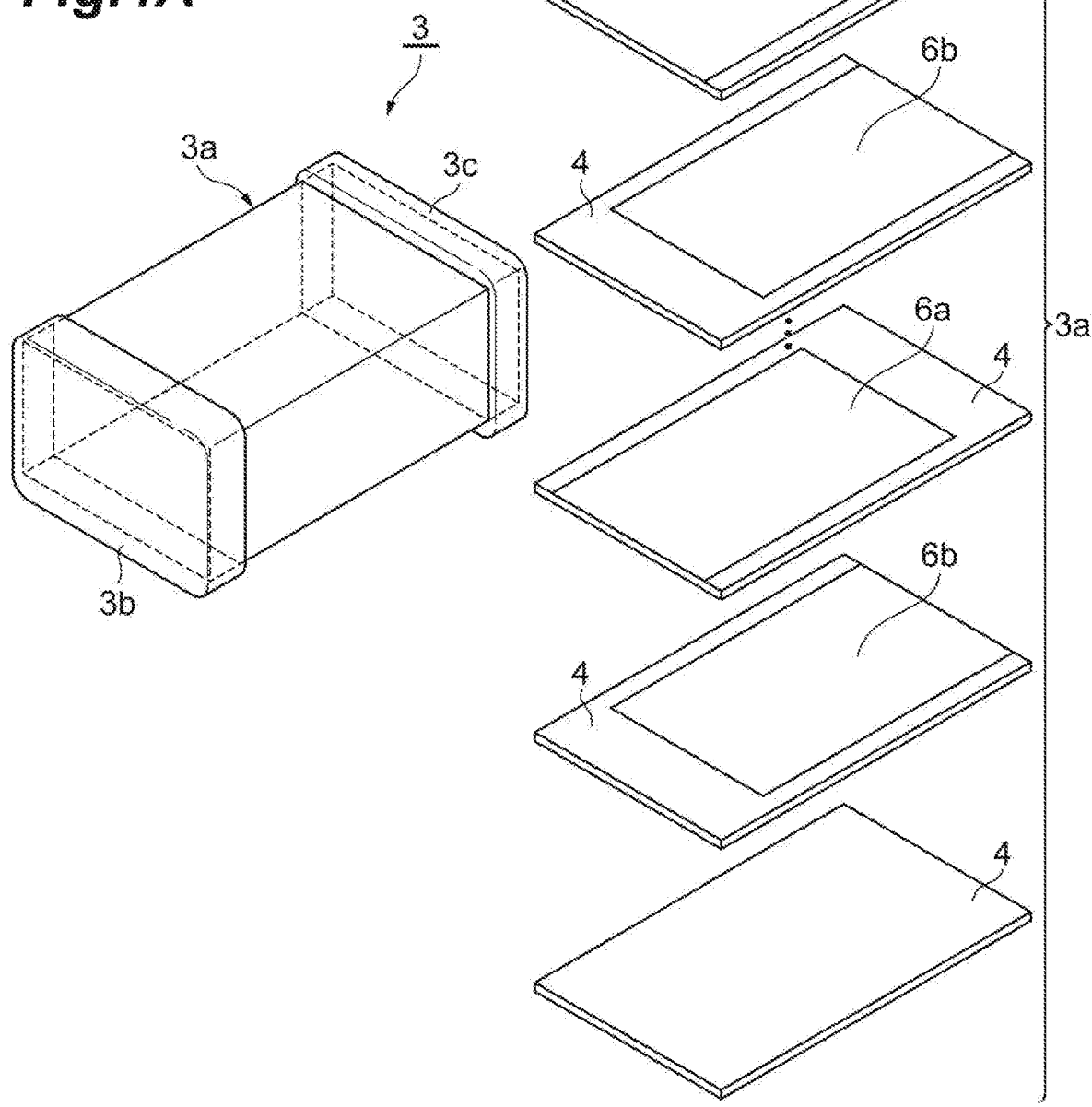
FIG. 4A is a perspective view illustrating a laminated capacitor.
FIG. 4B is an exploded perspective view of an element body of the laminated capacitor.

Each of the first capacitor group 5A and the second capacitor group 5B is configured to include a plurality (three, in the present embodiment) of laminated capacitors (electronic elements) 3. As illustrated in FIG. 4A, a laminated capacitor 3 includes an element body 3a, a first external electrode (one external electrode) 3b disposed on an outer front surface of the element body 3a, and a second external electrode (opposite external electrode) 3c.

As illustrated in FIG. 4A, the element body 3a has a parallelepiped shape. A parallelepiped shape includes a parallelepiped shape in which corner portions and ridge portions are chamfered and a parallelepiped shape in which corner portions and ridge portions are rounded. As illustrated in FIG. 4B, the element body 3a is configured to have a plurality of layered dielectric layers (insulator layers) 4. For example, each of the dielectric layers 4 is constituted of a sintered body of a ceramic green sheet including a dielectric material (dielectric ceramic such as a $BaTiO_3$-based ceramic, a $Ba(Ti, Zr)O_3$-based ceramic, or a $(Ba, Ca)TiO_3$-based ceramic). In an actual element body 3a, the dielectric layers 4 are integrated to the extent that boundaries between the dielectric layers 4 cannot be visually recognized.

The laminated capacitor 3 includes a plurality of first internal electrodes 6a and a plurality of second internal electrodes 6b as internal conductors disposed inside the element body 3a. In the present embodiment, the number of plurality of first internal electrodes 6a is the same as the number of plurality of second internal electrodes 6b. The plurality of first internal electrodes 6a and the plurality of second internal electrodes 6b are formed of a conductive material (for example, Ni or Cu) generally used for an internal electrode of a laminated electrical element. The plurality of first internal electrodes 6a and the plurality of second internal electrodes 6b are configured to be sintered bodies of a conductive paste including the foregoing conductive material.

The first internal electrodes 6a and the second internal electrodes 6b are alternately disposed. Inside the element body 3a, the first internal electrodes 6a and the second internal electrodes 6b are alternately disposed to face each other with a gap therebetween in a lamination direction of the dielectric layers 4.

As illustrated in FIG. 4A, the first external electrode 3b is disposed on one end portion side of the element body 3a in a longitudinal direction, and the second external electrode 3c is disposed on the opposite end portion side of the element body 3a in the longitudinal direction. That is, the first external electrode 3b and the second external electrode 3c are positioned to face each other in the longitudinal direction of the element body 3a and being away from each other. The first external electrode 3b and the second external electrode 3c include a conductive material (for example, Ag or Pd). The first external electrode 3b and the second external electrode 3c are configured to be sintered bodies of a conductive paste including a conductive metal powder (for example, an Ag powder or a Pd powder). The first external electrode 3b and the second external electrode 3c are subjected to electroplating, so that a plated layer is formed on the front surface thereof. For example, Ni or Sn is used for electroplating.

As illustrated in FIG. 2, the first capacitor group 5A and the second capacitor group 5B are disposed side by side in a first direction D1. In the first capacitor group 5A, the plurality of laminated capacitors 3 are arranged in a row in a second direction D2 orthogonal to (intersecting) the first direction D1 while a facing direction of the first external electrode 3b and the second external electrode 3c lies in the first direction D1. That is, in the first capacitor group 5A, the plurality of laminated capacitors 3 are arranged in a row such that the facing directions of the first external electrodes 3b and the second external electrodes 3c of the laminated capacitors 3 are substantially parallel to each other. Similarly, in the second capacitor group 5B, the plurality of laminated capacitors 3 are arranged in a row in the second direction D2 orthogonal to the first direction D while the facing direction of the first external electrode 3b and the second external electrode 3c lies in the first direction D1.

In the present embodiment, the first direction D1 is the longitudinal direction of the electronic component 1. The second direction D2 is a width direction of the electronic component 1. A third direction D3 orthogonal to the first direction D1 and the second direction D2 is a height direction of the electronic component 1.

The first terminal 7 is disposed between the first capacitor group 5A and the second capacitor group 5B. The first terminal 7 is a plate-shaped member. The first terminal 7 is constituted of a conductive member (for example, a metal). The first terminal 7 has an elongated shape. The first terminal 7 is disposed such that a thickness direction (facing direction of a first surface 7a and a second surface 7b, which will be described below) lies in the first direction D1. In addition, the first terminal 7 is disposed such that the longitudinal direction lies in the second direction D2 and a height direction lies in the third direction D3.

The first terminal 7 has the first surface 7a, the second surface 7b, and a slit 7c. The first terminal 7 is disposed such that the first surface 7a faces the second external electrodes 3c of the laminated capacitors 3 in the first capacitor group 5A and the second surface 7b faces the second external electrodes 3c of the laminated capacitors 3 in the second capacitor group 5B.

Figure 3:
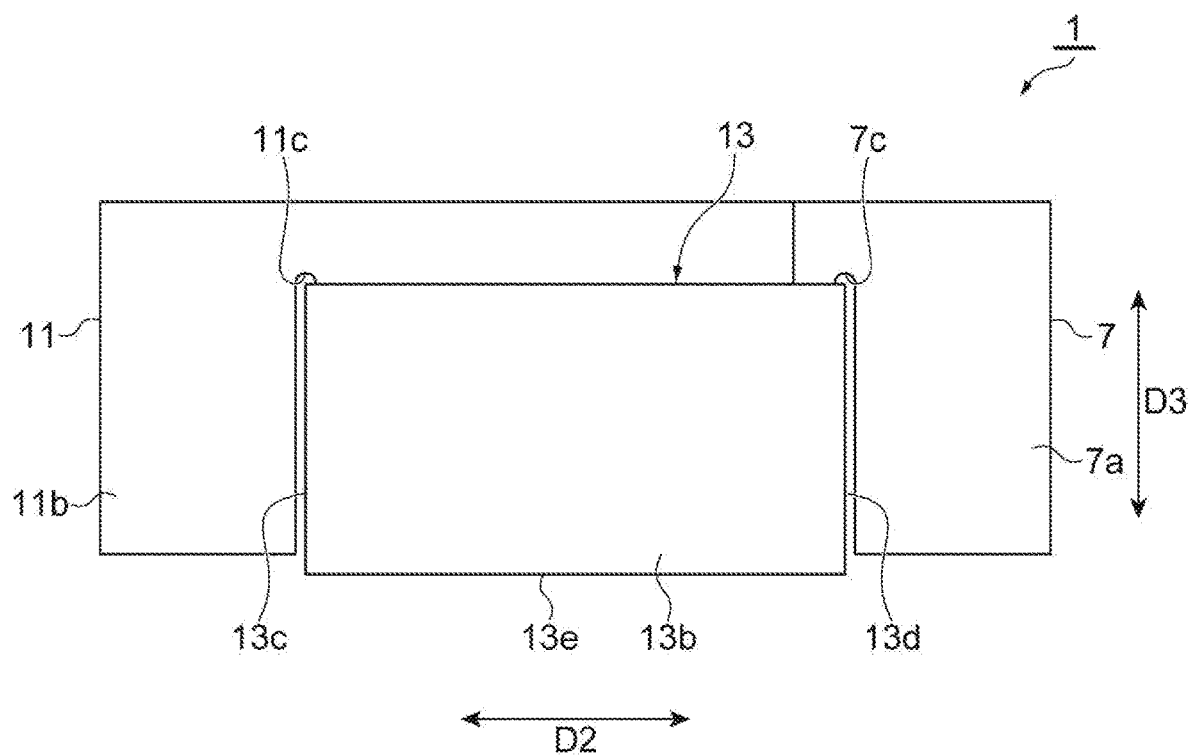
FIG. 3 is a side view of the electronic component illustrated in FIG. 1.

The first surface 7a is in contact with the first external electrodes 3b of the laminated capacitors 3 in the first capacitor group 5A. Accordingly, the first external electrodes 3b of the laminated capacitors 3 in the first capacitor group 5A and the first terminal 7 are electrically connected to each other. The second surface 7b is in contact with the first external electrodes 3b of the laminated capacitors 3 in the second capacitor group 5B. Accordingly, the first external electrodes 3b of the laminated capacitors 3 in the second capacitor group 5B and the first terminal 7 are electrically connected to each other. As illustrated in FIG. 3, the slit 7c extends in the third direction D3. A fourth wall portion 13d (which will be described below) of the case 13 is inserted into the slit 7c.

As illustrated in FIG. 2, the second terminal 9 and the second terminal 11 are disposed at positions with the first terminal 7 interposed therebetween in the first direction D1. The second terminal 9 is disposed to face the first surface 7a of the first terminal 7 on one side (left side, in the diagram) of the first terminal 7 in the first direction D1 and is positioned away from the first terminal 7. The second terminal 9 is disposed at a position with the first capacitor group 5A interposed between the second terminal 9 and the first terminal 7.

The second terminal 9 is a plate-shaped member. The second terminal 9 is formed of a conductive member (for example, a metal). The second terminal 9 has an elongated shape. The second terminal 9 is disposed such that the thickness direction (facing direction of a first surface 9a and a second surface 9b, which will be described below) lies in the first direction D1. In addition, the second terminal 9 is disposed such that the longitudinal direction lies in the second direction D2 and the height direction lies in the third direction D3.

The second terminal 9 has the first surface 9a, the second surface 9b, and a slit 9c. The second terminal 9 is disposed such that the first surface 9a faces the second external electrodes 3c of the laminated capacitors 3 in the first capacitor group 5A. The first surface 9a is in contact with the second external electrodes 3c of the laminated capacitors 3 in the first capacitor group 5A. Accordingly, the second external electrodes 3c of the laminated capacitors 3 in the first capacitor group 5A and the second terminal 9 are electrically connected to each other. The slit 9c extends in the third direction D3. A first wall portion 13a (which will be described below) of the case 13 is inserted into the slit 9c.

The second terminal 11 is disposed to face the second surface 7b of the first terminal 7 on the opposite side (right side, in the diagram) of the first terminal 7 in the first direction D and is positioned away from the first terminal 7. The second terminal 11 is disposed at a position with the second capacitor group 5B interposed between the second terminal 11 and the first terminal 7.

The second terminal 11 is a plate-shaped member. The second terminal 11 is formed of a conductive member (for example, a metal). The second terminal 11 has an elongated shape. The second terminal 11 is disposed such that the thickness direction (facing direction of a first surface 11a and a second surface 11b, which will be described below) lies in the first direction D1. In addition, the second terminal 11 is disposed such that the longitudinal direction lies in the second direction D2 and the height direction lies in the third direction D3.

The second terminal 11 has the first surface 11a, the second surface 11b, and a slit 11c. The second terminal 11 is disposed such that the first surface 11a faces the second external electrodes 3c of the laminated capacitors 3 in the second capacitor group 5B. The first surface 11a is in contact with the second external electrodes 3c of the laminated capacitors 3 in the second capacitor group 5B. Accordingly, the second external electrodes 3c of the laminated capacitors 3 in the second capacitor group 5B and the second terminal 11 are electrically connected to each other. As illustrated in FIG. 3, the slit 11c extends in the third direction D3. A second wall portion 13b (which will be described below) of the case 13 is inserted into the slit 11c.

The case 13 accommodates the first capacitor group 5A and the second capacitor group 5B. The case 13 is formed of a resin having insulating properties. As illustrated in FIGS. 1, 2, and 3, the case 13 has the first wall portion 13a and the second wall portion 13b forming a pair facing each other in the first direction D1; a third wall portion 13c and the fourth wall portion 13d forming a pair facing each other in the second direction D2; and a bottom portion 13e which closes one opening portion formed by the first wall portion 13a, the second wall portion 13b, the third wall portion 13c, and the fourth wall portion 13d. The case 13 has a box shape. In the case 13, an opening portion which is open upward is formed by the first wall portion 13a, the second wall portion 13b, the third wall portion 13c, and the fourth wall portion 13d.

As illustrated in FIG. 3, the fourth wall portion 13d of the case 13 is positioned in the slit 7c of the first terminal 7. That is, the first terminal 7 is disposed while straddling the fourth wall portion 13d. One end portion of the first terminal 7 in the second direction D2 protrudes outward beyond the fourth wall portion 13d of the case 13. The third wall portion 13c of the case 13 is positioned in the slit 9c of the second terminal 9. That is, the second terminal 9 is disposed while straddling the third wall portion 13c. As illustrated in FIG. 2, one end portion of the second terminal 9 in the second direction D2 protrudes outward beyond the third wall portion 13c of the case 13. As illustrated in FIG. 3, the third wall portion 13c of the case 13 is positioned in the slit 11c of the second terminal 11. That is, the second terminal 11 is disposed while straddling the third wall portion 13c. One end portion of the second terminal 11 in the second direction D2 protrudes outward beyond the third wall portion 13c of the case 13.

As illustrated in FIGS. 1 and 2, the case 13 is filled with a resin R. The resin R is a resin having insulating properties. The resin R has transmitting properties (is transparent), for example. In the electronic component 1, the first capacitor group 5A, the second capacitor group 5B, the first terminal 7, and the second terminals 9 and 11 are fixed inside the case 13 due to the resin R filling the case 13.

The electronic component 1 is mounted in a different electronic instrument (for example, a circuit board or another electronic component). A protrusion part of the first terminal 7 of the electronic component 1 is connected to a first wiring included in an electronic instrument. The protrusion parts of the second terminal 9 and the second terminal 11 of the electronic component 1 are connected to a second wiring included in the electronic instrument. Accordingly, the second terminal 9 and the second terminal 11 are electrically connected to each other.

Figure 5:
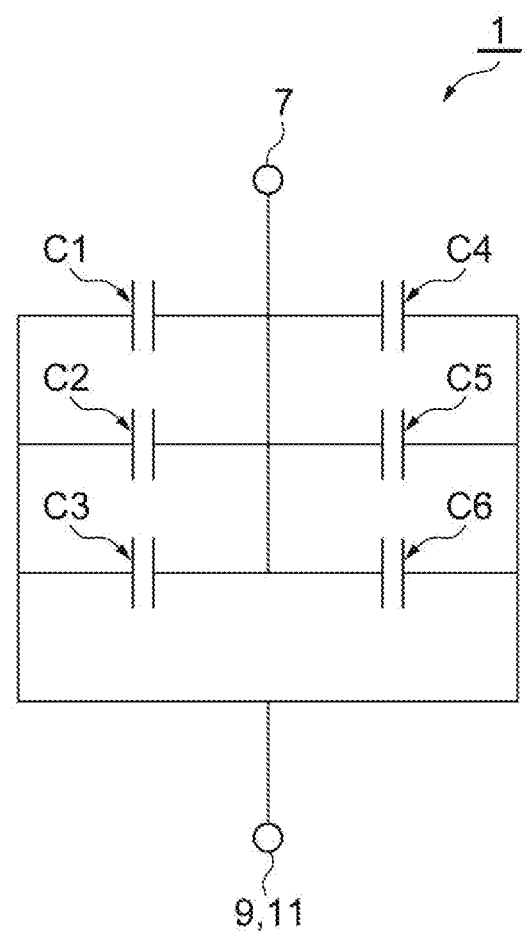
FIG. 5 is an equivalent circuit diagram of the electronic component illustrated in FIG. 1.

As illustrated in FIG. 5, in the electronic component 1 having the foregoing configuration, a plurality of capacitors C1 to C6 are connected to each other in parallel. Specifically, in the electronic component 1, the capacitors C1 to C3 are constituted of the first internal electrodes 6a and the second internal electrodes 6b of the laminated capacitors 3 in the first capacitor group 5A. Similarly, in the electronic component 1, the capacitors C4 to C6 are constituted of the first internal electrodes 6a and the second internal electrodes 6b of the laminated capacitors 3 in the second capacitor group 5B.

As described above, in the electronic component 1 according to the present embodiment, in each of the first capacitor group 5A and the second capacitor group 5B, the laminated capacitors 3 are disposed in the second direction D2, and the first capacitor group 5A and the second capacitor group 5B are disposed side by side in the first direction D1 (facing direction of the first external electrodes 3b and the second external electrodes 3c of the laminated capacitors 3) orthogonal to the second direction D2. The first terminal 7 is disposed between the first capacitor group 5A and the second capacitor group 5B. The second terminals 9 and 11 are disposed at positions with the first capacitor group 5A and the second capacitor group 5B respectively interposed between the second terminals 9 and 11 and the first terminal 7 in the first direction D1. According to this configuration, the electronic component 1 can be miniaturized in a configuration in which the plurality of laminated capacitors 3 are connected to each other in parallel. In addition, in the electronic component 1, since the plurality of laminated capacitors 3 can be connected to each other in parallel, a large capacity can be achieved.

The electronic component 1 according to the present embodiment includes the case 13 having electrical insulating properties. The first capacitor group 5A and the second capacitor group 5B are accommodated in the case 13. In this configuration, the first capacitor group 5A and the second capacitor group 5B are accommodated inside the case 13. Therefore, in the electronic component 1, the size of the electronic component 1 can be set by setting the size of the case 13.

In the electronic component 1 according to the present embodiment, the case 13 has the first wall portion 13a and the second wall portion 13b forming a pair facing each other in the first direction D1; the third wall portion 13c and the fourth wall portion 13d forming a pair facing each other in the second direction D2; and the bottom portion 13e which closes one opening portion formed by the first wall portion 13a, the second wall portion 13b, the third wall portion 13c, and the fourth wall portion 13d. In this configuration, the case 13 has a box shape. Accordingly, in the electronic component 1, the first capacitor group 5A and the second capacitor group 5B can be reliably accommodated in the case 13.

Second Embodiment

Figure 6:
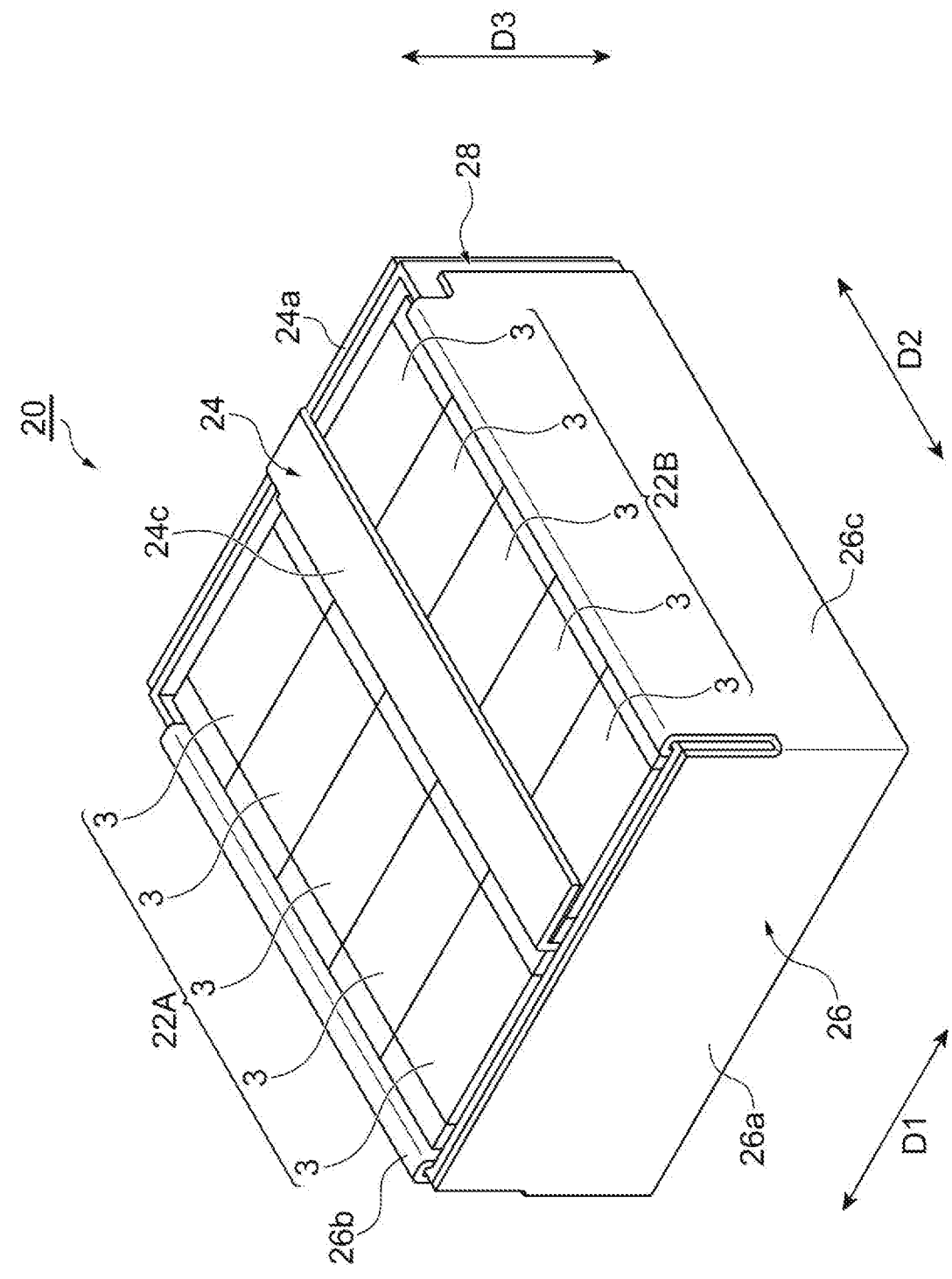
FIG. 6 is a perspective view illustrating an electronic component according to a second embodiment.
Figure 7:
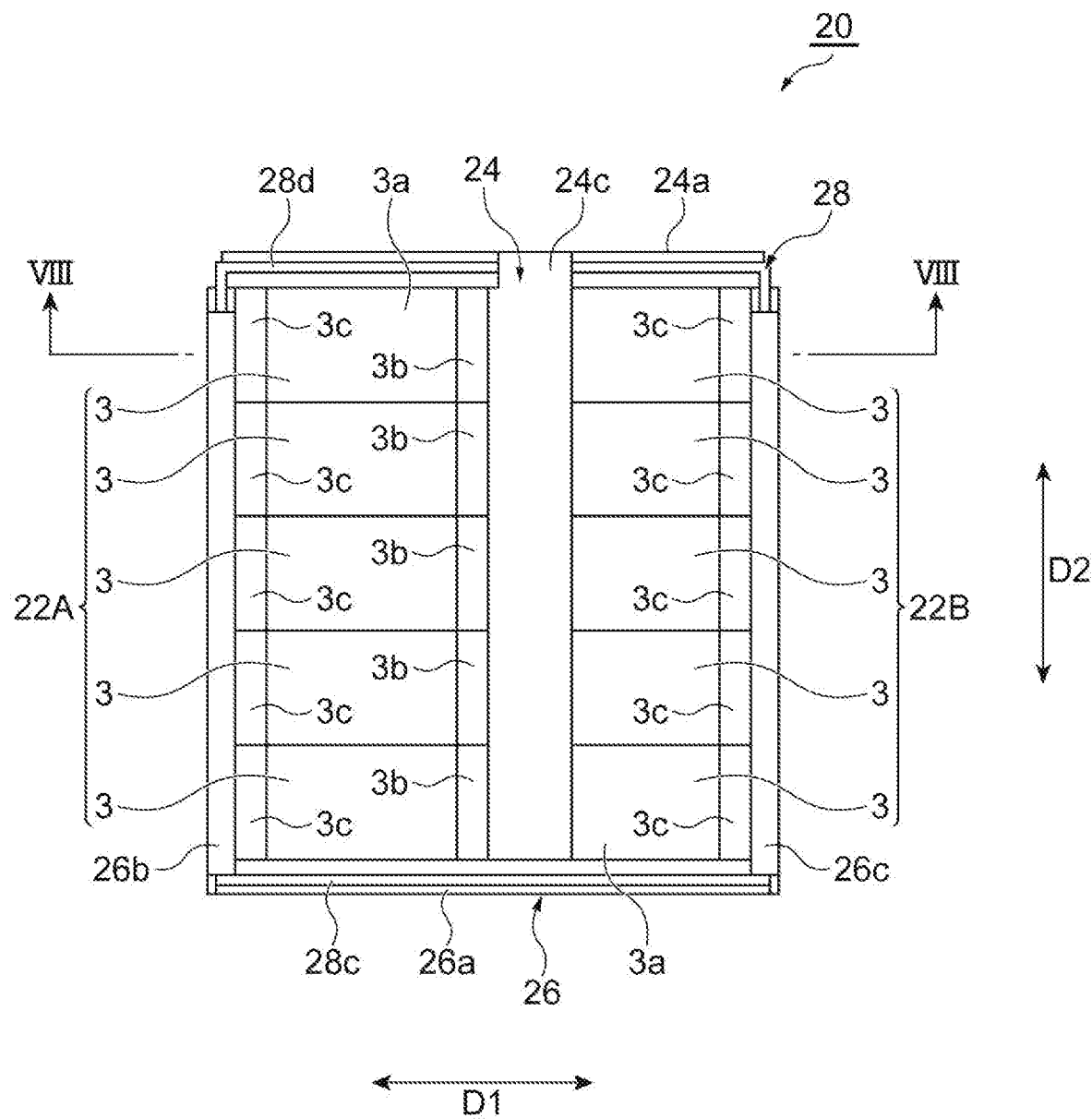
FIG. 7 is a top view of the electronic component illustrated in FIG. 6.

Subsequently, a second embodiment will be described. As illustrated in FIGS. 6 and 7, an electronic component 20 includes a first capacitor group 22A, a second capacitor group 22B, a first terminal 24, a second terminal 26, and a case 28.

Each of the first capacitor group 22A and the second capacitor group 22B is configured to include a plurality (five, in the present embodiment) of laminated capacitors 3.

As illustrated in FIG. 6 and FIG. 7, the first capacitor group 22A and the second capacitor group 22B are disposed side by side in the first direction D1. In the first capacitor group 22A, the plurality of laminated capacitors 3 are arranged in a row in the second direction D2 orthogonal to the first direction D1 while the facing direction of the first external electrode 3b and the second external electrode 3c lies in the first direction D1. That is, in the first capacitor group 22A, the plurality of laminated capacitors 3 are arranged in a row such that the facing directions of the first external electrodes 3b and the second external electrodes 3c of the laminated capacitors 3 are substantially parallel to each other. Similarly, in the second capacitor group 22B, the plurality of laminated capacitors 3 are arranged in a row in the second direction D2 orthogonal to the first direction D1 while the facing direction of the first external electrode 3b and the second external electrode 3c lies in the first direction D1.

Figure 9:
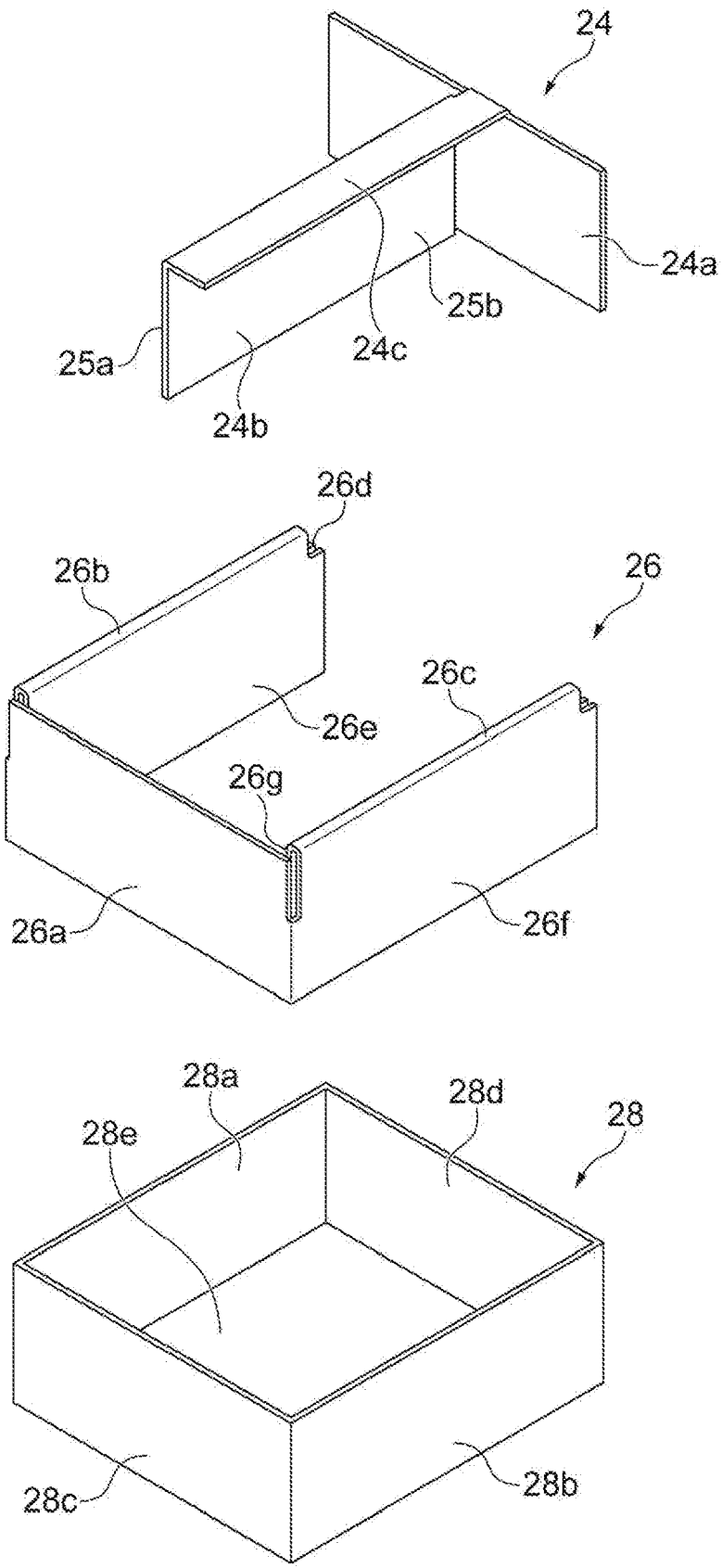
FIG. 9 is a perspective view illustrating a first terminal, a second terminal, and a case.

As illustrated in FIG. 9, the first terminal 24 has a first member 24a, a second member 24b, and a third member 24c. For example, a first terminal 23 is formed of a conductive member (for example, a metal). The first member 24a, the second member 24b, and the third member 24c are plate-shaped members and are integrally formed through press working or the like.

The first member 24a extends in the first direction D1. The first member 24a has an elongated shape. The first member 24a is disposed to face a fourth wall portion 28d (which will be described below) of the case 28.

The second member 24b extends in the second direction D2. As illustrated in FIG. 9, the second member 24b has an elongated shape. The first member 24a and the second member 24b have a T-shape when viewed in the third direction D3.

Figure 8:
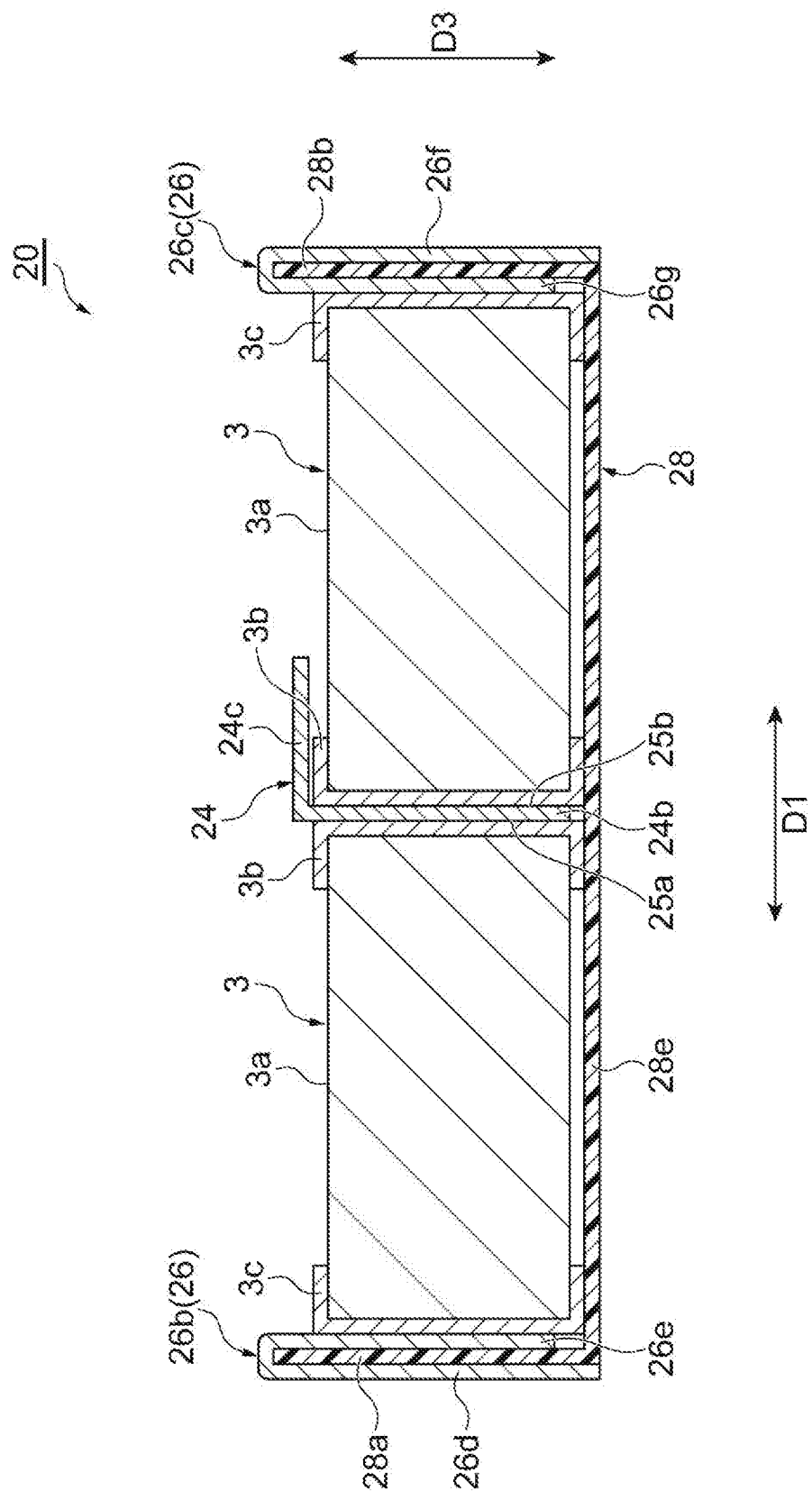
FIG. 8 is a view illustrating a cross-sectional configuration taken along line VIII-VIII in FIG. 7.

As illustrated in FIG. 8, a first surface 25a of the second member 24b is in contact with the first external electrodes 3b of the laminated capacitors 3 in the first capacitor group 22A. Accordingly, the first external electrodes 3b of the laminated capacitors 3 in the first capacitor group 22A and the first terminal 24 are electrically connected to each other. A second surface 25b of the second member 24b is in contact with the first external electrodes 3b of the laminated capacitors 3 in the second capacitor group 22B. Accordingly, the first external electrodes 3b of the laminated capacitors 3 in the second capacitor group 22B and the first terminal 24 are electrically connected to each other.

The third member 24c extends in the second direction D2. The third member 24c has an elongated shape (belt shape). The third member 24c causes the first member 24a and the second member 24b to be coupled to each other. The third member 24c extends (bulges out) toward a third wall portion 28c (which will be described below) of the case 28 from an upper end portion (one end portion) of the first member 24a in the third direction D3 in a middle portion of the first member 24a in the first direction D1. The second member 24b extends in the third direction D3 from one end portion of the third member 24c in the first direction D1. The second member 24b extends toward a bottom portion 28e from the third member 24c. The second member 24b and the third member 24c form a substantially right angle. The second member 24b and the third member 24c have an L-shape when viewed in the second direction D2. As illustrated in FIG. 8, the third member 24c faces the laminated capacitors 3 (first external electrodes 3b) in the second capacitor group 22B.

Figure 10:
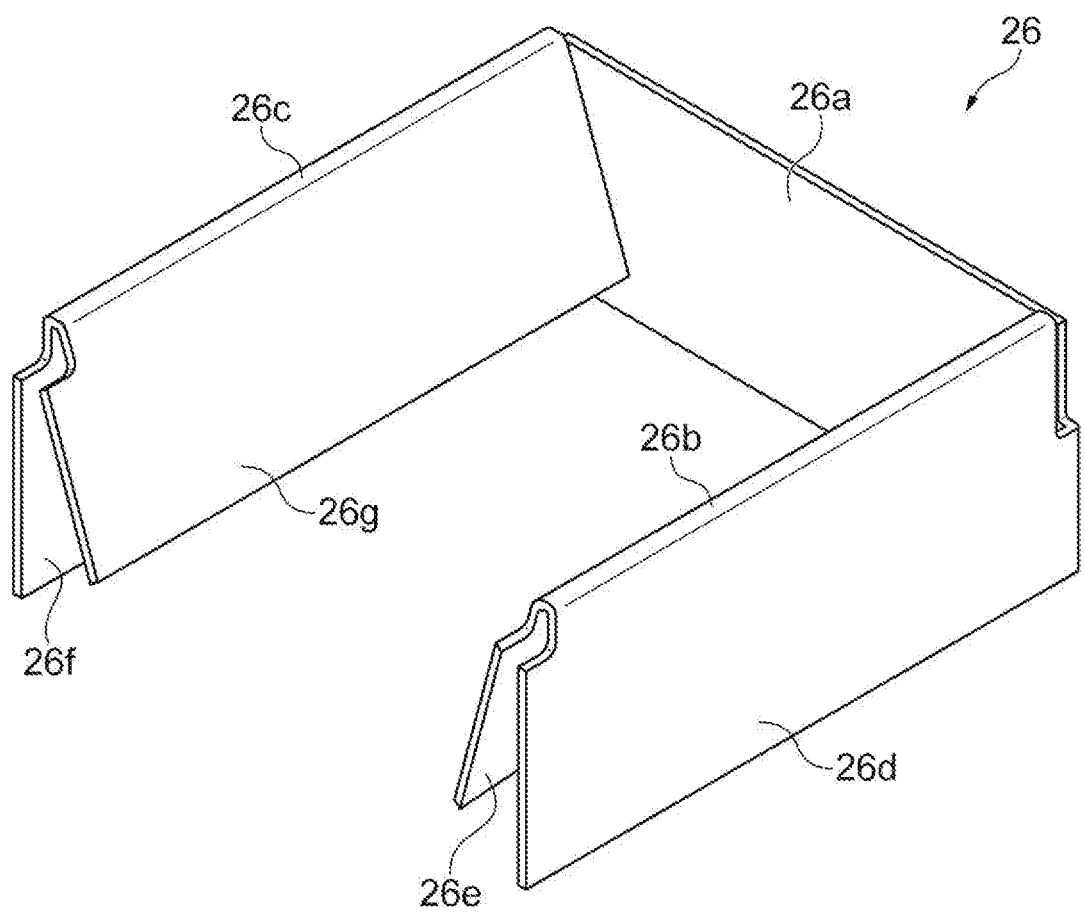
FIG. 10 is a perspective view illustrating the second terminal.

As illustrated in FIGS. 9 and 10, the second terminal 26 has a first member 26a, a second member 26b, and a third member 26c. The first member 26a, the second member 26b, and the third member 26c are plate-shaped members and are integrally formed through press working or the like.

The first member 26a extends in the first direction D1. The first member 26a has an elongated shape. The first member 26a is disposed to face the fourth wall portion 28d (which will be described below) of the case 28.

The second member 26b is connected to one end portion of the first member 26a in the first direction D1. The third member 26c is connected to the opposite end portion of the first member 26a in the first direction D1. The second member 26b and the third member 26c are disposed to face each other in the first direction D1.

The second member 26b has a first part 26d and a second part 26e. The first part 26d and the second part 26e have a substantially elongated shape. The first part 26d is connected to the first member 26a. The second part 26e is positioned on the inner side of (third member 26c side) of the first part 26d and faces the first part 26d. The first part 26d and the second part 26e are connected to one end portion in the third direction D3. As illustrated in FIG. 8, the first part 26d and the second part 26e are disposed with a first wall portion 28a of the case 28 interposed therebetween. That is, the second member 26b is disposed while straddling the first wall portion 28a.

The second part 26e is in contact with the second external electrodes 3c of the laminated capacitors 3 in the first capacitor group 22A. Accordingly, the second external electrodes 3c of the laminated capacitors 3 in the first capacitor group 22A and the second terminal 26 are electrically connected to each other. The second part 26e has spring properties. The second part 26e biases the plurality of laminated capacitors 3 disposed between the second member 26b of the second terminal 26 and the first terminal 24 to the first terminal 24 side (in a direction away from the first part 26d). That is, the second part 26e functions as a biasing portion. Accordingly, the laminated capacitors 3 are held between the first terminal 24 and second terminal 26.

As illustrated in FIGS. 9 and 10, the third member 26c has a first part 26f and a second part 26g. The first part 26f and the second part 26g have a substantially elongated shape. The first part 26f is connected to the first member 26a. The second part 26g is positioned on the inner side (second member 26b side) of the first part 26f and faces the first part 26f. The first part 26f and the second part 26g are connected to one end portion in the third direction D3. As illustrated in FIG. 8, the first part 26f and the second part 26g are disposed with a second wall portion 28b of the case 28 interposed therebetween. That is, the third member 26c is disposed while straddling the second wall portion 28b.

The second part 26g is in contact with the second external electrodes 3c of the laminated capacitors 3 in the first capacitor group 22A. Accordingly, the second external electrodes 3c of the laminated capacitors 3 in the first capacitor group 22A and the second terminal 26 are electrically connected to each other. The second part 26g has spring properties. The second part 26g biases the plurality of laminated capacitors 3 disposed between the third member 26c of the second terminal 26 and the first terminal 24 to the first terminal 24 side (in a direction away from the first part 26f). That is, the second part 26g functions as a biasing portion. Accordingly, the laminated capacitors 3 are held between the first terminal 24 and second terminal 26.

The case 28 accommodates the first capacitor group 22A and the second capacitor group 22B. The case 28 is formed of a resin having insulating properties. As illustrated in FIG. 9, the case 28 has the first wall portion 28a and the second wall portion 28b forming a pair facing each other in the first direction D1; the third wall portion 28c and the fourth wall portion 28d forming a pair facing each other in the second direction D2; and a bottom portion 28e which closes one opening portion formed by the first wall portion 28a, the second wall portion 28b, the third wall portion 28c, and the fourth wall portion 28d. In the case 28, an opening portion which is open upward is formed by the first wall portion 28a, the second wall portion 28b, the third wall portion 28c, and the fourth wall portion 28d.

The electronic component 20 is mounted in a different electronic instrument (for example, a circuit board or another electronic component). The first terminal 24 of the electronic component 20 is connected to a first wiring included in an electronic instrument. The second terminal 26 of the electronic component 20 is connected to a second wiring included in the electronic instrument.

Figure 11:
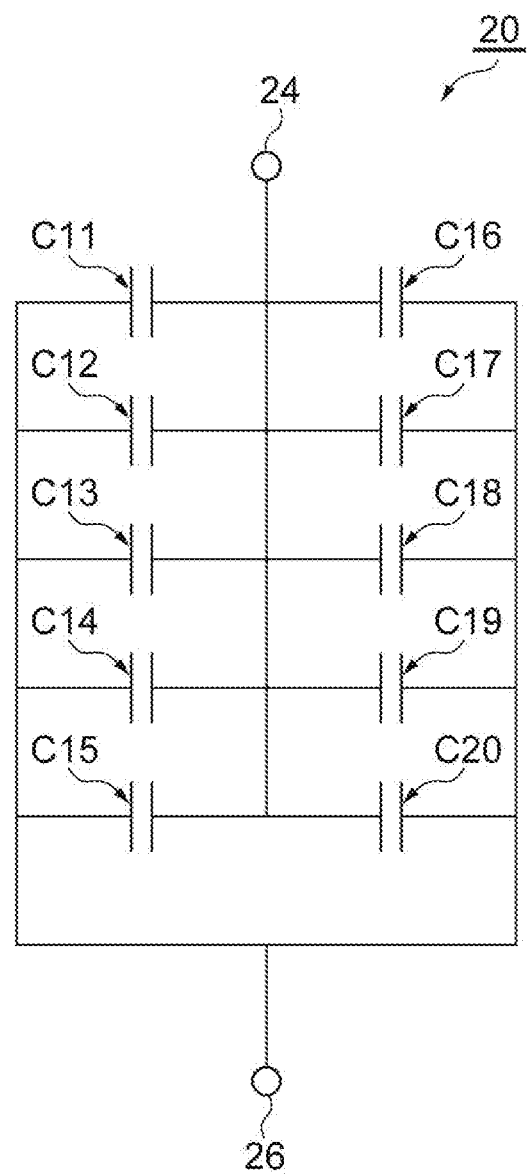
FIG. 11 is an equivalent circuit diagram of the electronic component illustrated in FIG. 6.

As illustrated in FIG. 11, in the electronic component 20 having the foregoing configuration, a plurality of capacitors C11 to C20 are connected to each other in parallel. Specifically, in the electronic component 20, the capacitors C11 to C15 are constituted of the first internal electrodes 6a and the second internal electrodes 6b of the laminated capacitors 3 in the first capacitor group 22A. Similarly, in the electronic component 20, the capacitor C16 to C20 are constituted of the first internal electrodes 6a and the second internal electrodes 6b of the laminated capacitors 3 in the second capacitor group 22B.

As described above, in the electronic component 20 according to the present embodiment, in each of the first capacitor group 22A and the second capacitor group 22B, the laminated capacitors 3 are disposed in the second direction D2, and the first capacitor group 22A and the second capacitor group 22B are disposed side by side in the first direction D1 (facing direction of the first external electrodes 3b and the second external electrodes 3c of the laminated capacitors 3) orthogonal to the second direction D2. The first terminal 24 is disposed between the first capacitor group 22A and the second capacitor group 22B. The second terminal 26 is disposed at a position with the first capacitor group 22A and the second capacitor group 22B respectively interposed between the second terminal 26 and the first terminal 24 in the first direction D1. According to this configuration, the electronic component 20 can be miniaturized in a configuration in which the plurality of laminated capacitors 3 are connected to each other in parallel. In addition, in the electronic component 20, since the plurality of laminated capacitors 3 can be connected to each other in parallel, a large capacity can be achieved.

In the electronic component 20 according to the present embodiment, the second terminal 26 causes the first external electrode 3b of each of the plurality of laminated capacitors 3 in the first capacitor group 22A and the second external electrode 3c of each of the plurality of laminated capacitors 3 in the second capacitor group 22B to be electrically connected to each other. In the electronic component 1 of the first embodiment, the second terminal 9 and the second terminal 11 are isolated from each other. Therefore, when the electronic component 1 is mounted, there is a need for two second terminals 9 and 11 to be electrically connected to each other using a wiring or the like. In the electronic component 20, the laminated capacitors 3 in the first capacitor group 22A and the laminated capacitors 3 in the second capacitor group 22B are electrically connected to each other in the electronic component 20. Therefore, the electronic component 20 can be easily mounted on a circuit board or the like.

In the electronic component 20 according to the present embodiment, the first terminal 24 has the first member 24a which extends in the first direction D1 and the second member 24b which extends in the second direction D2 and is connected to the first external electrode 3b of each of the plurality of laminated capacitors 3 in the first capacitor group 22A and the first external electrode 3b of each of the plurality of laminated capacitors 3 in the second capacitor group 22B. The second terminal 26 has the first member 26a which extends in the first direction D1; the second member 26b which is connected to one end portion of the first member 26a in the first direction D1, extends in the second direction D2, and is connected to the second external electrode 3c of each of the plurality of laminated capacitors 3 in the first capacitor group 22A; and the third member 26c which is connected to the opposite end portion of the first member 26a in the first direction D1, extends in the second direction D2, faces the second member 26b in the first direction D1, and is connected to each of the second external electrodes 3c of the plurality of laminated capacitors 3 in the second capacitor group 22B. In this configuration, the laminated capacitors 3 in the first capacitor group 22A and the laminated capacitors 3 in the second capacitor group 22B can be connected to each other in parallel.

In the electronic component 20 according to the present embodiment, the first terminal 24 has the third member 24c which causes the first member 24a and the second member 24b to be coupled to each other. The third member 24c is disposed to face the plurality of laminated capacitors 3. In this configuration, movement (misalignment or the like) of the laminated capacitors 3 can be restricted due to the third member 24c. Therefore, in the electronic component 20, falling off of the laminated capacitors 3 can be avoided.

In the electronic component 20 according to the present embodiment, the second member 26b and the third member 26c of the second terminal 26 have the second part 26e and the second part 26g which bias each of the plurality of laminated capacitors 3 such that each of the plurality of laminated capacitors is pressed to the first terminal 24 side facing in the first direction D1. In this configuration, the laminated capacitors 3 are bias (pressed) to the first terminal 24 side. Therefore, the laminated capacitors 3 can be adequately held between the first terminal 24 and second terminal 26.

Figure 12:
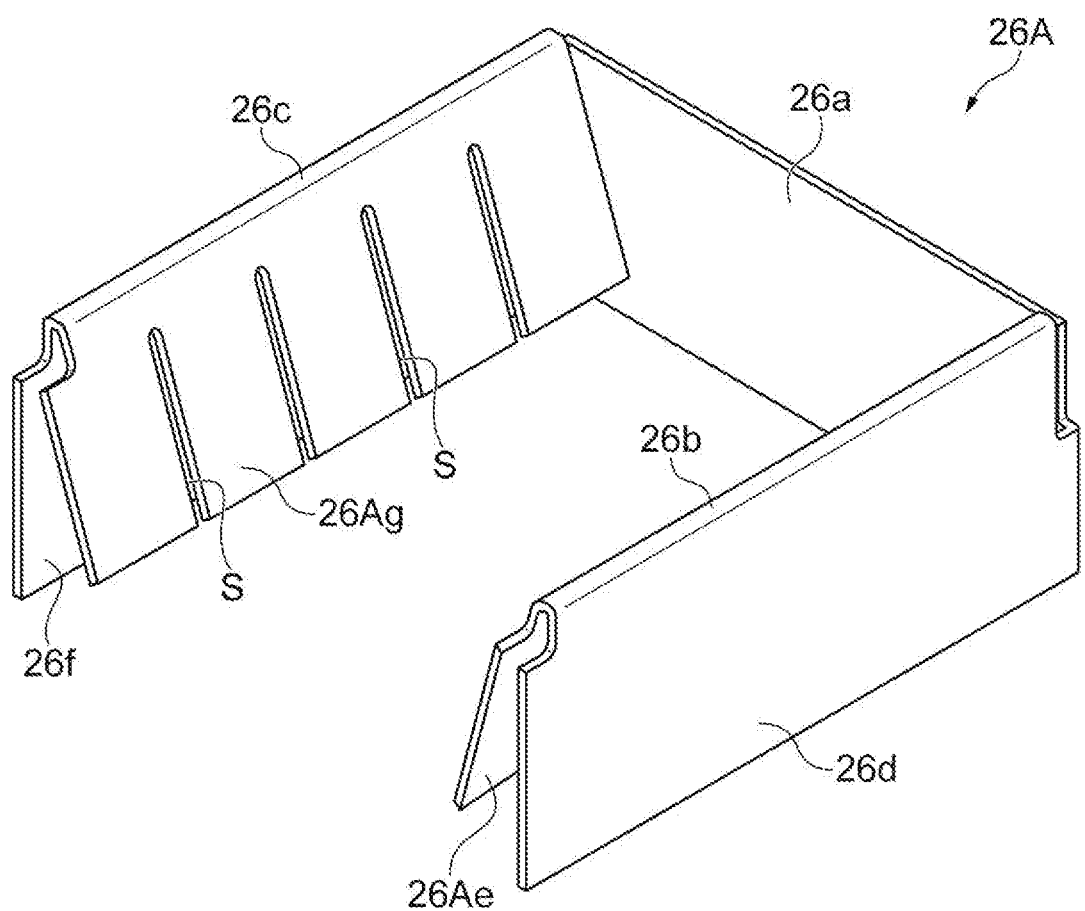
FIG. 12 is a view illustrating a second terminal according to a modification example.

In the foregoing embodiments, a form in which the second part 26e of the second member 26b of the second terminal 26 and the second part 26g of the third member 26c have an elongated shape has been described as an example. However, as illustrated in FIG. 12, a second part 26Ae and a second part 26Ag of the second terminal 26 may be divided into a plurality of parts by a slit S in a manner corresponding to each of the plurality of laminated capacitors 3.

In this configuration, even when the plurality of laminated capacitors 3 differ from each other in size, the plurality of laminated capacitors 3 can be held between the first terminal 24 and second terminal 26.

Third Embodiment

Figure 13:
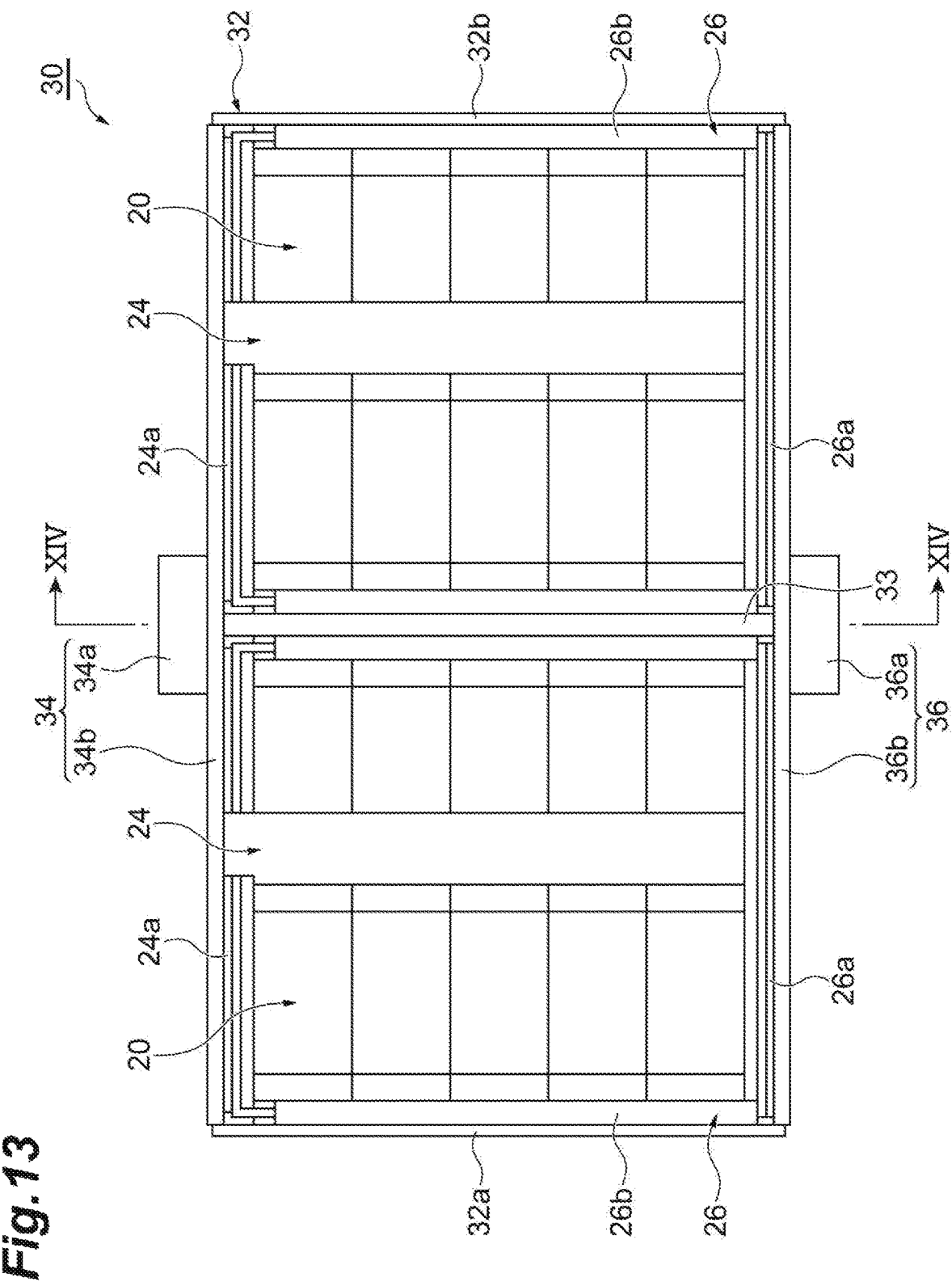
FIG. 13 is a top view of an electronic component according to a third embodiment.

Subsequently, a third embodiment will be described. As illustrated in FIG. 13, an electronic component 30 includes two electronic components 20, a case 32, a first terminal 34, and a second terminal 36. In the electronic component 30, one electronic component 20 and the opposite electronic component 20 are connected to each other in parallel. The electronic component 20 constitutes an electronic element group including the first capacitor group 22A and the second capacitor group 22B.

Figure 14:
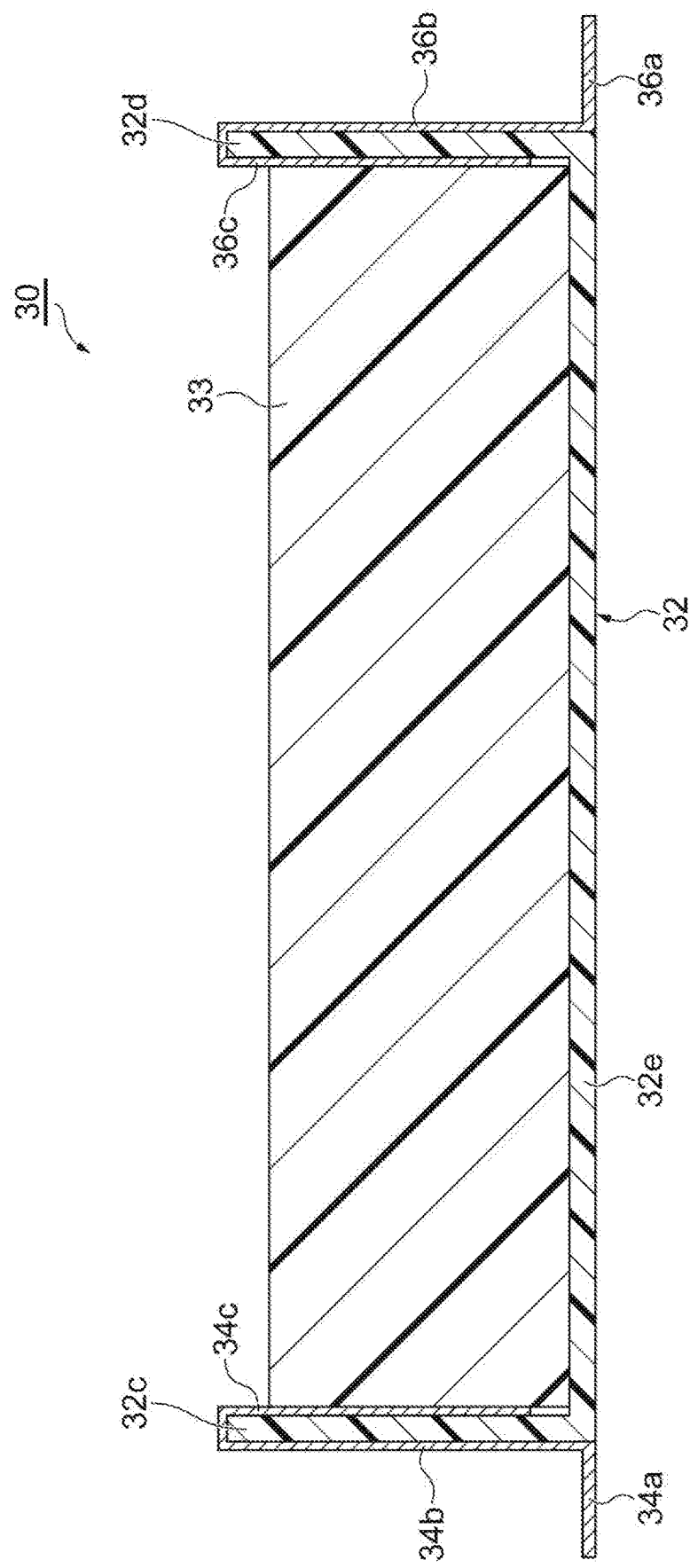
FIG. 14 is a view illustrating a cross-sectional configuration taken along line XIV-XIV in FIG. 13.

The case 32 accommodates the two electronic components 20. The case 32 is formed of a resin having insulating properties. As illustrated in FIGS. 13 and 14, the case 32 has a first wall portion 32a and a second wall portion 32b forming a pair while facing each other in the first direction D1; a third wall portion 32c and a fourth wall portion 32d forming a pair while facing each other in the second direction D2; and a bottom portion 32e which closes one opening portion formed by the first wall portion 32a, the second wall portion 32b, the third wall portion 32c, and the fourth wall portion 32d. In the case 32, an opening portion which is open upward is formed by the first wall portion 32a, the second wall portion 32b, the third wall portion 32c, and the fourth wall portion 32d.

A partition wall portion (insulating member) 33 is provided in the case 32. The partition wall portion 33 is a plate member having an elongated shape. The partition wall portion 33 is formed of a resin having insulating properties. The partition wall portion 33 extends in the second direction D2. The partition wall portion 33 is disposed across the third wall portion 32c and the fourth wall portion 32d of the case 32. The partition wall portion 33 disposed in the middle of the first direction D inside the case 32. One electronic component 20 and the opposite electronic component 20 adjacent to each other inside the case 32 are electrically insulated from each other due to the partition wall portion 33.

The first terminal 34 has a first member 34a, a second member 34b, and a third member 34c. The first member 34a, the second member 34b, and the third member 34c are plate-shaped members and are integrally formed through press working or the like.

The first member 34a is disposed in the middle of the first direction D1. The first member 34a extends in the second direction D2. The first member 34a protrudes outward from the third wall portion 32c of the case 32. The second member 34b and the third member 34c have a substantially elongated shape. The second member 34b and the third member 34c are connected to one end portion in the third direction D3. As illustrated in FIG. 14, the second member 34b and the third member 34c are disposed with the third wall portion 32c of the case 32 interposed therebetween. That is, the first terminal 34 is disposed while straddling the third wall portion 32c.

The third member 34c is in contact with the second terminal 26 (first member 26a) of each of the electronic components 20. Accordingly, the second terminal 26 of each of the electronic components 20 and the first terminal 34 are electrically connected to each other.

The second terminal 36 has a first member 36a, a second member 36b, and a third member 36c. The first member 36a, the second member 36b, and the third member 36c are plate-shaped members and are integrally formed through press working or the like.

The first member 36a is disposed in the middle of the first direction D1. The first member 36a extends in the second direction D2. The first member 36a protrudes outward from the fourth wall portion 32d of the case 32. The second member 36b and the third member 36c have an elongated shape. The second member 36b and the third member 36c are connected to one end portion in the third direction D3. As illustrated in FIG. 14, the second member 36b and the third member 36c are disposed with the fourth wall portion 32d of the case 32 interposed therebetween. That is, the second terminal 36 is disposed while straddling the fourth wall portion 32d.

The third member 36c is in contact with the first terminal 24 (first member 24a) of the electronic component 20. Accordingly, the first terminal 24 of each of the electronic components 20 and second terminal 36 are electrically connected to each other.

The electronic component 30 is mounted in a different electronic instrument (for example, a circuit board or another electronic component). The first terminal 34 of the electronic component 30 is connected to a first wiring included in an electronic instrument. The second terminal 36 of the electronic component 30 is connected to a second wiring included in the electronic instrument.

Figure 15:
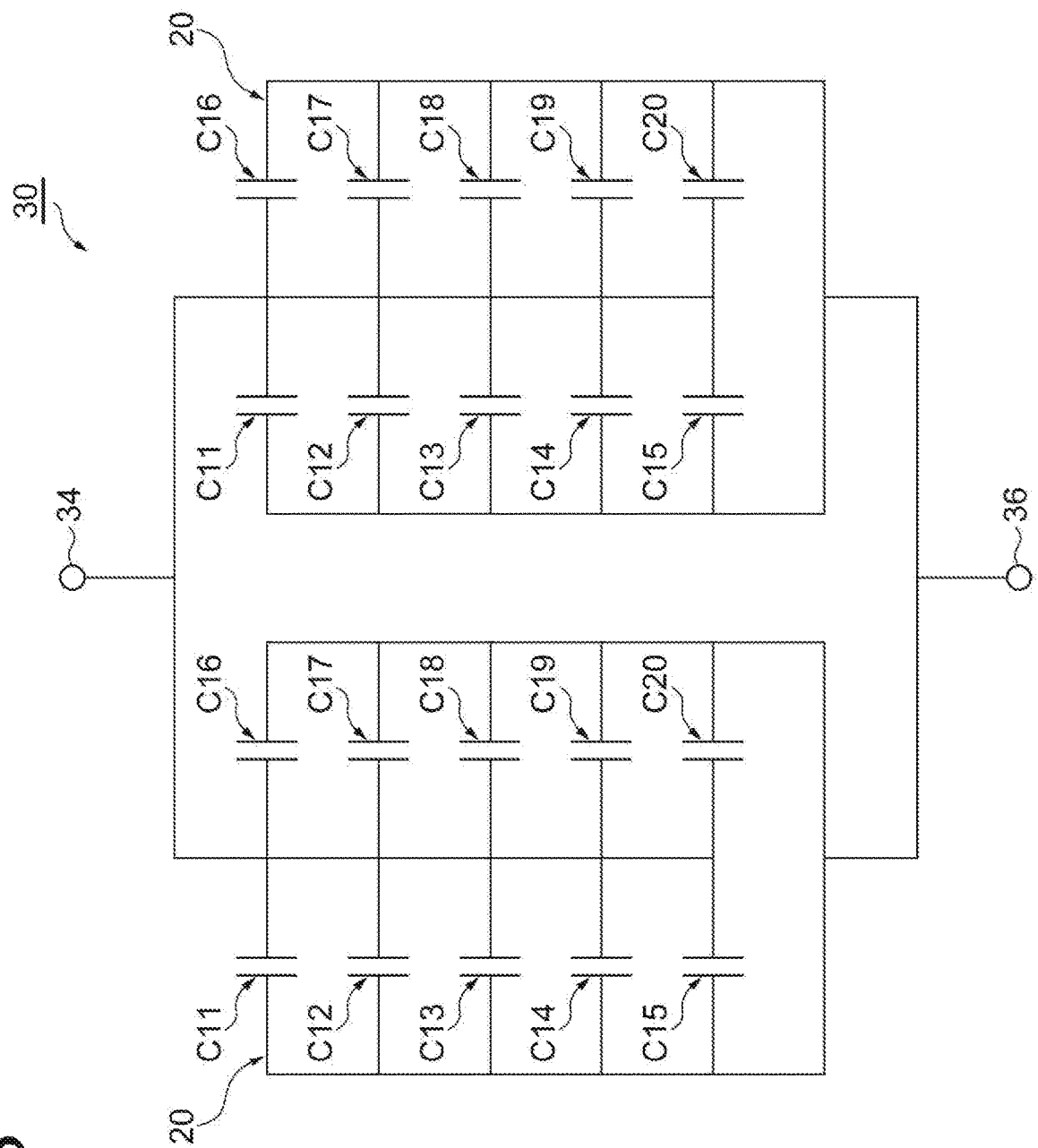
FIG. 15 is an equivalent circuit diagram of the electronic component illustrated in FIG. 13.

As illustrated in FIG. 15, in the electronic component 30 having the foregoing configuration, one electronic component 20 and the opposite electronic component 20 are connected to each other in parallel. In each of the electronic components 20, the capacitors C11 to C15 are constituted of the first internal electrodes 6a and the second internal electrodes 6b of the laminated capacitors 3 in the first capacitor group 22A. Similarly, in the electronic component 20, the capacitor C16 to C20 are constituted of the first internal electrodes 6a and the second internal electrodes 6b of the laminated capacitors 3 in the second capacitor group 22B.

In the electronic component 30 according to the present embodiment, the electronic component 20 and the electronic component 20 are connected to each other in parallel. Accordingly, a large electrostatic capacitance can be ensured in the electronic component 30.

Hereinabove, the embodiments of the present invention have been described. However, the present invention is not necessarily limited to the embodiments described above, and various changes can be made within a range not departing from the gist thereof.

In the foregoing embodiments, a form in which the electronic element is the laminated capacitor 3 has been described as an example. However, for example, the electronic element may be a coil component or the like.

In the foregoing first embodiment, a form in which the first capacitor group 5A, the second capacitor group 5B, the first terminal 7, and the second terminals 9 and 11 are fixed inside the case 13 due to the resin R filling the case 13 has been described as an example. However, a method for fixing each of the components to the case 13 is not limited to a resin.

In the foregoing first embodiment, a form in which the first terminal 7, the second terminal 9, and the second terminal 11 are plate-shaped members having an elongated shape has been described as an example. However, the shapes of the first terminal 7, the second terminal 9, and the second terminal 11 are not limited thereto.

In the foregoing second embodiment, a form in which the second part 26e and the second part 26g of the second terminal 26 function as biasing portions has been described as an example. However, a biasing portion may be provided in the first terminal.

In the foregoing second embodiment, a form in which the third member 24c of the first terminal 24 overlaps the laminated capacitors 3 in the second capacitor group 22B in the third direction D3 has been described as an example. However, a form in which a third member overlaps the laminated capacitors 3 in the first capacitor group 22A in the third direction D3 may be adopted, or a form in which both the first capacitor group 22A and the second capacitor group 22B overlap the laminated capacitors 3 in the third direction D3 may be adopted.

In the foregoing embodiments, forms in which the cases 13, 28, and 32 are formed of a resin having insulating properties have been described as examples. However, the cases 13, 28, and 32 may be formed of an insulating material such as a ceramic.

What is claimed is:

1. An electronic component comprising:
a first electronic element group and a second electronic element group that are configured to include a plurality of electronic elements having a pair of external electrodes facing each other;
a first terminal that is connected to one external electrode of each of the plurality of electronic elements in the first electronic element group and one external electrode of each of the plurality of electronic elements in the second electronic element group; and
second terminals that are connected to an opposite external electrode of each of the plurality of electronic elements in the first electronic element group and an opposite external electrode of each of the plurality of electronic elements in the second electronic element group,
wherein the plurality of electronic elements are arranged in a second direction orthogonal to a first direction which is a facing direction of the pair of external electrodes in the first electronic element group and the second electronic element group,
wherein the first electronic element group and the second electronic element group are disposed side by side in the first direction,
wherein the first terminal is disposed between the first electronic element group and the second electronic element group in the first direction,
wherein the second terminals are disposed at positions with the first electronic element group and the second electronic element group respectively interposed between the second terminals and the first terminal in the first direction,
wherein the first terminal has an overall T-shape when viewed from the third direction and includes
a first member which extends in the first direction, and
a second member which extends in the second direction and is connected to one external electrode of each of the plurality of electronic elements in the first electronic element group and one external electrode of each of the plurality of electronic elements in the second electronic element group, and
wherein the second terminal has an overall approximately U-shape when viewed in the third direction and includes
a first member which extends in the first direction,
a second member which is connected to one end portion of the first member in the first direction, extends in the second direction, and is connected to the opposite external electrode of each of the plurality of electronic elements in the first electronic element group, and
a third member which is connected to an opposite end portion of the first member in the first direction, extends in the second direction, faces the second member in the first direction, and is connected to each of the opposite external electrodes of the plurality of electronic elements in the second electronic element group.

2. The electronic component according to claim 1,
wherein the second terminal causes the opposite external electrode of each of the plurality of electronic elements in the first electronic element group and the opposite external electrode of each of the plurality of electronic elements in the second electronic element group to be electrically connected to each other.

3. The electronic component according to claim 1, further comprising:
a case that accommodates the first electronic element group and the second electronic element group and has electrical insulation properties.

4. The electronic component according to claim 3,
wherein the case has
a first wall portion and a second wall portion which form a pair facing each other in the first direction;
a third wall portion and a fourth wall portion which form a pair facing each other in the second direction; and
a bottom portion which closes one opening portion formed by the first wall portion, the second wall portion, the third wall portion, and the fourth wall portion.

5. The electronic component according to claim 1,
wherein the first terminal has a third member through which the first member and the second member are coupled to each other, and
wherein the third member is disposed to face the plurality of electronic elements.

6. The electronic component according to claim 1,
wherein at least one of the first terminal and the second terminal has a biasing portion which biases each of the plurality of electronic elements such that each of the plurality of electronic elements is pressed to the facing terminal side in the first direction.

7. The electronic component according to claim 6,
wherein the biasing portion is divided into a plurality of portions in a manner corresponding to each of the plurality of electronic elements.

8. The electronic component according to claim 1, further comprising:
a plurality of electronic element groups including the first electronic element group and the second electronic element group,
wherein the plurality of electronic element groups are disposed side by side with an insulating member interposed therebetween inside the case, and
wherein one electronic element group and another electronic element group are connected to each other in parallel.

9. An electronic component comprising:
a first electronic element group and a second electronic element group that are configured to include a plurality of electronic elements having a pair of external electrodes facing each other;
a first terminal that is connected to one external electrode of each of the plurality of electronic elements in the first electronic element group and one external electrode of each of the plurality of electronic elements in the second electronic element group;
second terminals that are connected to an opposite external electrode of each of the plurality of electronic elements in the first electronic element group and an opposite external electrode of each of the plurality of electronic elements in the second electronic element group; and
a case that accommodates the first electronic element group and the second electronic element group and has electrical insulation properties
wherein the plurality of electronic elements are arranged in a second direction orthogonal to a first direction which is a facing direction of the pair of external electrodes in the first electronic element group and the second electronic element group, wherein the first electronic element group and the second electronic element group are disposed side by side in the first direction, wherein the first terminal is disposed between the first electronic element group and the second electronic element group in the first direction, wherein the second terminals are disposed at positions with the first electronic element group and the second electronic element group respectively interposed between the second terminals and the first terminal in the first direction, wherein the first terminal has
- a first member which extends in the first direction, and
- a second member which extends in the second direction and is connected to one external electrode of each of the plurality of electronic elements in the first electronic element group and one external electrode of each of the plurality of electronic elements in the second electronic element group, wherein the second terminal has
- a first member which extends in the first direction,
- a second member which is connected to one end portion of the first member in the first direction, extends in the second direction, and is connected to the opposite external electrode of each of the plurality of electronic elements in the first electronic element group, and
- a third member which is connected to an opposite end portion of the first member in the first direction, extends in the second direction, faces the second member in the first direction, and is connected to each of the opposite external electrodes of the plurality of electronic elements in the second electronic element group, wherein at least one of the first terminal and the second terminal has a biasing portion which biases each of the plurality of electronic elements such that each of the plurality of electronic elements is pressed to the facing terminal side in the first direction, an the second member of the second terminal and the third member of the second terminal both include a first part and a second part such that the second member of the second terminal and the third member of the second terminal both sandwich respective wall portions of the case.

* * * * *